(12) United States Patent
Schroeder

(10) Patent No.: US 7,071,682 B2
(45) Date of Patent: Jul. 4, 2006

(54) MAGNETIC ARRAY POSITION SENSOR AND METHOD

(75) Inventor: Thaddeus Schroeder, Rochester Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 36 days.

(21) Appl. No.: 10/881,299

(22) Filed: Jun. 30, 2004

(65) Prior Publication Data

US 2006/0001418 A1 Jan. 5, 2006

(51) Int. Cl.
*G01B 7/14* (2006.01)
*G01B 7/30* (2006.01)

(52) U.S. Cl. ............................. 324/207.24; 324/207.25

(58) Field of Classification Search ........... 324/207.21, 324/207.24, 207.25
See application file for complete search history.

(56) References Cited

U.S. PATENT DOCUMENTS

| 6,201,466 | B1 | 3/2001 | Schroeder ................ 338/32 R |
| 6,577,984 | B1 | 6/2003 | Clairet et al. ............... 702/151 |
| 2004/0150393 | A1* | 8/2004 | Lequesne et al. ...... 324/207.21 |
| 2004/0263155 | A1* | 12/2004 | Schroeder et al. ..... 324/207.12 |

OTHER PUBLICATIONS

U.S. Appl. No. 10/603,462, filed Jun. 25, 2003, Schroeder et al.

* cited by examiner

*Primary Examiner*—Edward Lefkowitz
*Assistant Examiner*—David M Schindler
(74) *Attorney, Agent, or Firm*—Jimmy L. Funke

(57) ABSTRACT

A movable target having individually identifiable magnetic irregularities and a stationary magnetosensitive array and circuit for sensing the magnetic irregularities to thereby provide position of the moveable target relative to a fixed initial location. A method to determine a present position of the target origin including the steps of: identifying a magnetic irregularity of the moveable target; determining a first distance, Y, equal to a distance of the identified magnetic irregularity to a target origin; determining a second distance, X, equal to a distance of the identified magnetic irregularity to the array origin; and determining a distance, L, of the target origin with respect to the fixed initial location, according to a relation: $L=L_0+X-Y$.

14 Claims, 4 Drawing Sheets

MAGNETIC ARRAY POSITION SENSOR AND METHOD

TECHNICAL FIELD

The invention relates to magnetic position sensors and, more particularly, to magnetic position sensors using an array consisting of galvanomagnetic sensing elements.

BACKGROUND OF THE INVENTION

Galvanomagnetic sensing elements, such as Hall generators and different types of magnetoresistors (MRs), are widely used in automotive and industrial position and speed sensors. They can operate in most environments as they are relatively unaffected by dirt, most chemicals, oils and other lubricants. They can operate up to reasonably high temperatures (150 or 200 degrees C.) depending on the sensing device material.

The majority of these sensors use one, or at most two, sensing elements. Sensors with a single sensing element are the simplest, but also the least accurate. Sensors with two matched sensing elements spaced some distance apart from each other are used in a differential mode, whereby common mode disturbances are rejected. Two element sensors operating in differential mode provide better accuracy than single element sensors. Since they are capable of locating with high accuracy a particular feature of the sensed object, such as a tooth edge or a center of a slot, such differential sensors are often used as incremental (on-off) sensors, e.g., as crankshaft position sensors. The differential sensor, however, cannot maintain the same high accuracy if it is used as a linear sensor, providing a continuous analog output signal proportional to displacement. This is especially true where relatively large displacements, i.e., those on the order of five mm or higher, are measured.

SUMMARY OF THE INVENTION

The present invention is a linear magnetic position sensor for determining the linear or angular present position of a first reference location of a ferromagnetic target, herein called the target origin, from an initially known second reference position of the target origin, herein called the initial position of the target origin. The sensor includes a stationary linear array of galvanomagnetic sensing elements mounted, preferably, upon a surface of a magnet fixedly mountable adjacent the target, wherein the target moves adjacent a surface of the array thereby generating a unique magnetic flux density pattern from excitation of the sensing elements of the stationary linear array. This pattern, in general, preferably consists of peaks and valleys. Any aspect of the target that results in a peak is generically referred to herein as a magnetic tooth or, simply, a tooth wherein any aspect of the target that results in a valley is generically referred to herein as a magnetic slot or, simply, a slot.

In a first preferred embodiment of the present invention, the target includes a plurality of magnetic irregularities each of which being uniquely identifiable, as for example unique teeth and/or slots, such that a magnetic flux density resulting from excitation of the sensing elements of the stationary linear array consists of uniquely identifiable peaks and/or valleys directly corresponding to the uniquely identifiable teeth and/or slots of the target. The magnetic flux density pattern resulting from excitation of the sensing elements of the stationary linear array includes, at least, preferably, two peaks, or one peak and one valley, or two valleys, whereby a tooth and/or a slot is uniquely identifiable from at least the respective two peaks, or peak and valley, or two valleys of the magnetic flux density so as to thereby uniquely determine the position of a, preferably, tooth or slot with respect to the target origin.

Appropriate signal processing algorithms identify the location of the tooth or slot with respect to a location on the stationary linear array, herein called the array origin, whose distance from the initial position of the target origin is known, whereby the linear or angular present position of the target origin from the initial position of the target origin can be determined.

In a second preferred embodiment of the present invention, the target includes a plurality of uniquely identifiable magnetic irregularities, as for example uniquely identifiable teeth and/or slots, such that a magnetic flux density resulting from excitation of the sensing elements of the stationary linear array consists of uniquely identifiable peaks and/or valleys directly corresponding to the uniquely identifiable teeth and/or slots of the target. The magnetic flux density resulting from excitation of the sensing elements of the stationary linear array includes at least one peak or one valley, whereby a tooth and/or a slot is uniquely identifiable from at least the one peak or one valley of the magnetic flux density so as to thereby uniquely determine the position of a tooth or slot with respect to the target origin. Appropriate signal processing algorithms identify the location of the tooth or slot with respect to a location on the stationary linear array, herein called the array origin, whose distance from the initial position of the target origin is known, whereby the linear or angular present position of the target origin from the initial position of the target origin can be determined.

A first circuit is used for exciting each of the sensing elements, and a second circuit is used for measuring a magnetic flux density value at each of the sensing elements. Each magnetic flux density value is associated with the magnetic flux density curve.

Accordingly, it is an object of the present invention to provide a magnetic array position sensor and methodology of use therefor in which an array identifies a target feature of a target and obtains its corresponding distance, Y, to a target origin of the target; then algorithmically determines a distance, X, of the target feature relative to an array origin of the array, wherein the array is located a fixed distance, $L_0$, from an initial position of the target origin; and then determines a distance, L, of a present position of the target origin from the initial position of the target origin, according to the relation: $L=L_0+X-Y$.

This and additional objects, features and advantages of the present invention will become clearer from the following specification of a preferred embodiment.

BRIEF DESCRIPTION OF THE DRAWINGS

The description herein makes reference to the accompanying drawings, wherein like reference numerals refer to like parts throughout the several views.

DESCRIPTION OF THE PREFERRED EMBODIMENT

Figure 1:
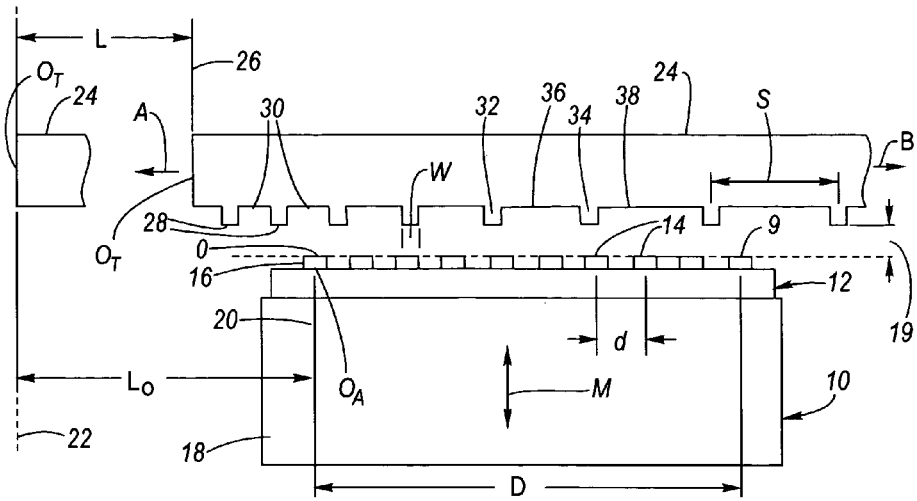
FIG. 1 is a schematic view of an array sensor and target in accordance with the present invention.

Referring now to the Drawing, FIG. 1 is a schematic view of a magnetic linear array sensor 10 and target 24 in accordance with the present invention, wherein the magnetic linear array sensor is usable to measure either angular or linear position of the target relative to an initial position of the target according to the method of the present invention. The magnetic linear array sensor 10 includes a linear array 12 mounted on a bias magnet 18, which is preferably of the permanent type, but may be, alternatively, of the electromagnetic type. The linear array 12 is linear and comprises a plurality of, preferably but not necessarily, generally identical and, preferably but not necessarily, equidistantly spaced galvanomagnetic sensing elements 14 on a single die 16. Of course, more than one die 16 can also be used to form the linear array 12. The sensing elements 14 of the linear array 12 can be Hall elements or magnetoresistive elements, by way of example. Details of the construction of one linear array 12 that can be used in the present invention are disclosed in U.S. Pat. No. 6,201,466, the entire contents of which is hereby incorporated herein by reference.

In the example of FIG. 1, the linear array 12 has ten sensing elements 14 mutually spaced equidistantly apart by a (center-to-center) distance d along the length of the linear array 12. The sensing elements 14 are identified as array element numbers 0 to 9. The total (on-center) distance between the first and last sensing elements, array element numbers 0 and 9 in this example, is indicated by a distance D. In this example, the (on-center) position 20 of the first array element number 0 is, arbitrarily, chosen as the array origin $O_A$ and is at a known distance $L_0$ from an initial position 22 of a target origin $O_T$ of the target 24, wherein movement of the target results in a present position of the target $O_T$ at a new position 26 which is located at a distance L from the initial position 22 of the target.

Target 24, by way of preferred example, consists of a sequential series of magnetic irregularities in the form of magnetic teeth 28 and slots 30 movably supported above the linear array 12. The target 24 can be one of a variety of configurations, as discussed in more detail below. The bottom of the target 24 is located above the top surfaces of the sensing elements 14, thereby defining an air gap 19. Although described as an "air gap", the air gap 19 between the target 24 and the sensing elements 14 does not necessarily exist as empty space. An overmolding layer protecting the linear array 12 and a protective coating for the target 24 and target assembly, if used, are magnetically indistinguishable from air and comprise part of the air gap 19. The teeth 28, in this example, have a tooth width W that is narrower than the spacing d between the sensing elements 14 and move in the direction indicated by the arrows A and B in response to respective movement of the target 24 to which they are attached.

The stationary magnetic linear array sensor 10 and target 24 can be one of a variety of configurations such that a magnetic flux density resulting from excitation of the sensing elements 14 of the linear array 12 consists of uniquely identifiable peaks and/or valleys directly corresponding to uniquely identifiable teeth 28 and/or slots 30 of the target. The exemplar magnetic tooth 28 or slot 30 will provide, when present at a position above the linear array 12, a peak or valley, respectively, when viewing, as sensed by the sensing elements 14, the associated magnetic flux density generated by the bias magnet 18. This is because the position of the peak or valley, i.e., the location of the maximum or minimum voltage, is immune to air gap 19 variations. It is also preferable for a peak or valley to be roughly symmetrical about the location of its respective maximum or minimum.

In the first preferred embodiment of the present invention, the linear array 12 consists of, preferably but not necessarily, generally identical, equidistantly spaced d galvanomagnetic sensing elements 14, wherein the spacing d between adjacent galvanomagnetic sensing elements is known. The spacing d between adjacent galvanomagnetic sensing elements 14 is, preferably, stored in microprocessor 46, 56 memory, if necessary (see FIGS. 2 and 3). The target 24 consists of teeth 28, each tooth having a width W preferably narrower than the minimum spacing d between adjacent galvanomagnetic sensing elements 14. Preferably, two adjacent teeth, for example, 32, 34 at a position above the linear array 12 result in two peaks in the magnetic flux density sensed by the sensing elements 14; or, for example, a tooth 32 and adjacent slot 36 at a position above the linear array result in one peak and one valley in the magnetic flux density sensed by the sensing elements; or, for example, two adjacent slots 36, 38 at a position above the linear array result in two valleys in the magnetic flux density sensed by the sensing elements. Accordingly, a tooth and/or slot is uniquely identifiable from at least the respective two peaks, or peak and valley, or two valleys, of the magnetic flux density so as to thereby uniquely determine the position of a, preferably, tooth or slot with respect to the target origin 26.

In FIG. 1, the target 24, for example, may consist of identical teeth 28 separated by slots 30 wherein the spacing S of slots between adjacent teeth varies in a predetermined manner, available, for example, from a lookup table stored in microprocessor 46, 56 memory. As a result, the location of a tooth 32, for example, from the present position 26 of the target origin $O_T$ is uniquely identified by the distance between the highest points of two adjacent peaks in the magnetic flux density, one of which peaks, preferable the first peak, corresponds to the tooth 32.

Appropriate signal processing algorithms identify the location of the tooth 32, for example, with respect to the array origin $O_A$, whose distance $L_0$ from the initial position 22 of the target origin $O_T$ is known, whereby the linear or angular present position 26 of the target origin $O_T$ from the initial position 22 of the target origin can be determined, as will be detailed hereinbelow.

In the second preferred embodiment of the present invention, linear array 12 consists of, preferably but not necessarily, generally identical equidistantly spaced galvanomagnetic sensing elements 14 wherein the spacing d between adjacent galvanomagnetic sensing elements is known. A tooth 28 having unique predetermined features or a slot 30 having unique predetermined features at a position above linear array 12 will result in a respective peak having unique predetermined features or valley having unique predetermined features in the magnetic flux density sensed by the sensing elements 14. As a result, a tooth or a slot is uniquely identifiable from at least a peak or valley of the magnetic flux density, thereby uniquely determining the position of a tooth or a slot with respect to the present position 26 of the target origin $O_T$.

In FIG. 1, the target 24, for example, may consist of teeth 28 having unique predetermined features separated by slots 30 having unique predetermined features, such that the location of a tooth 28 or a slot 30 from the target origin 26 is uniquely identified by a single peak or a single valley in the magnetic flux density. Locating, for example, the lowest point of the valley in the magnetic flux density identifies the distance of a slot 30, for example, from the target origin 26. Appropriate signal processing algorithms identify the location of the slot 30, for example, with respect to the array origin $O_A$, whose distance $L_0$ from the initial position 22 of the target origin $O_T$ is known, whereby the linear or angular present position 26 of the target origin $O_T$ from the initial position 22 of the target origin can be determined, as will be detailed hereinbelow.

Processing circuitry is operatively connected to the linear array 12 according to known methods to excite the sensing elements 14. The processing circuitry is also capable of scanning a voltage output of each sensing element 14 and digitizing each voltage output. The voltage output at each sensing element 14 is directly related to, and thus can be used to represent, the component of magnetic flux generated by the biasing magnet 18 at each sensing element. The processing circuitry can be a microprocessor or a digital signal processor (DSP), or the like, connected to the linear array 12 by electrical leads or integrated with the linear array 12 on the same die 16. The processing circuitry preferably includes memory, but it could be connected to external memory capable of storing the digitized voltage output data of each sensing element 14 and storing a program including one or more algorithms, described in further detail herein, to determine the precise position of the target origin 26 from the initial position 22 of the target (i.e. the distance L). In this regard, FIGS. 2 and 3 are two examples of processing circuitry 50, 40 that can be used to measure the voltage output of each sensing element 14.

Figure 2:
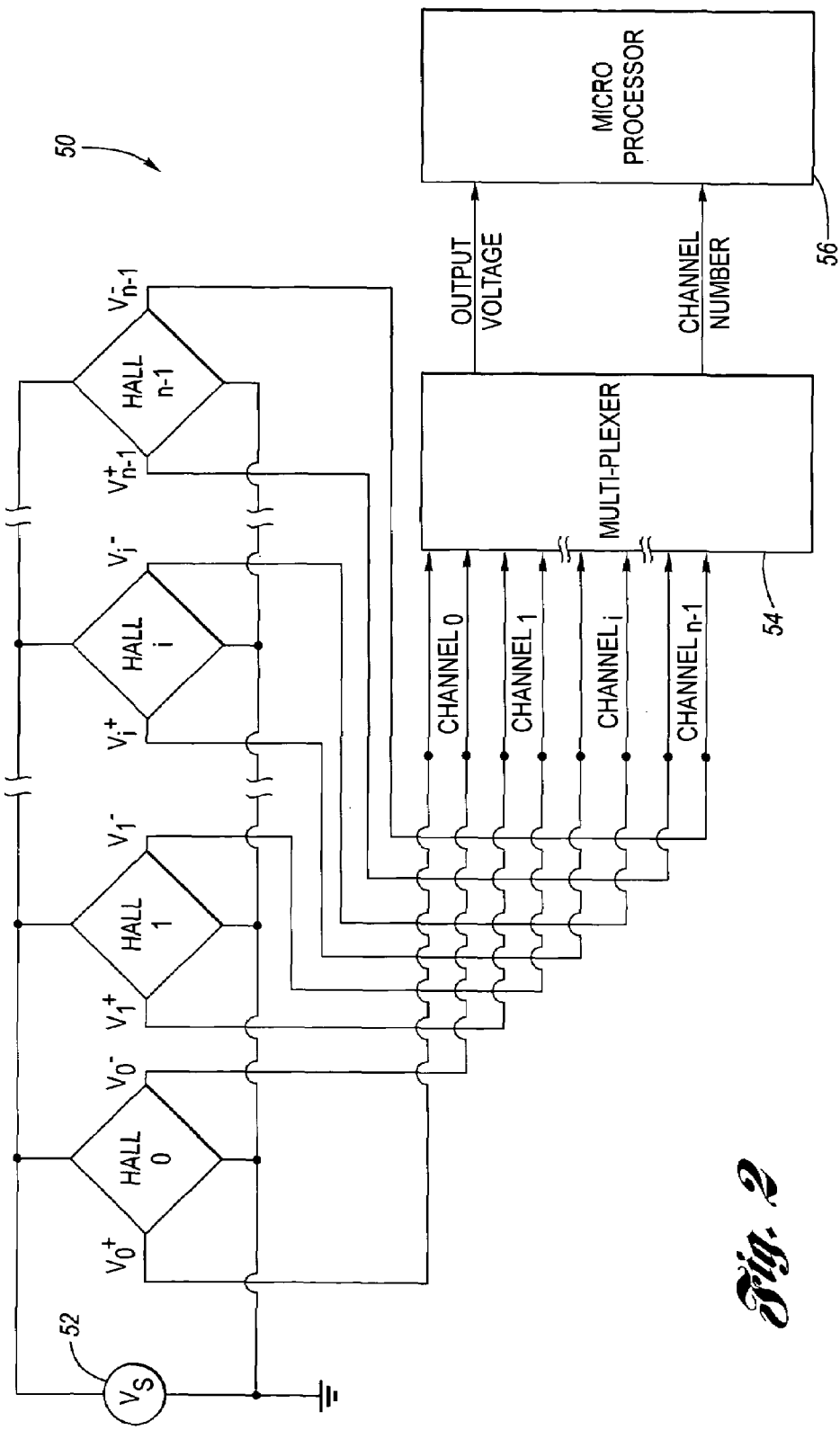
FIG. 2 is a circuit diagram including a circuit for exciting a Hall element sensor array and a circuit for measuring the resultant magnetic flux density through the sensing elements thereof.
Figure 3:
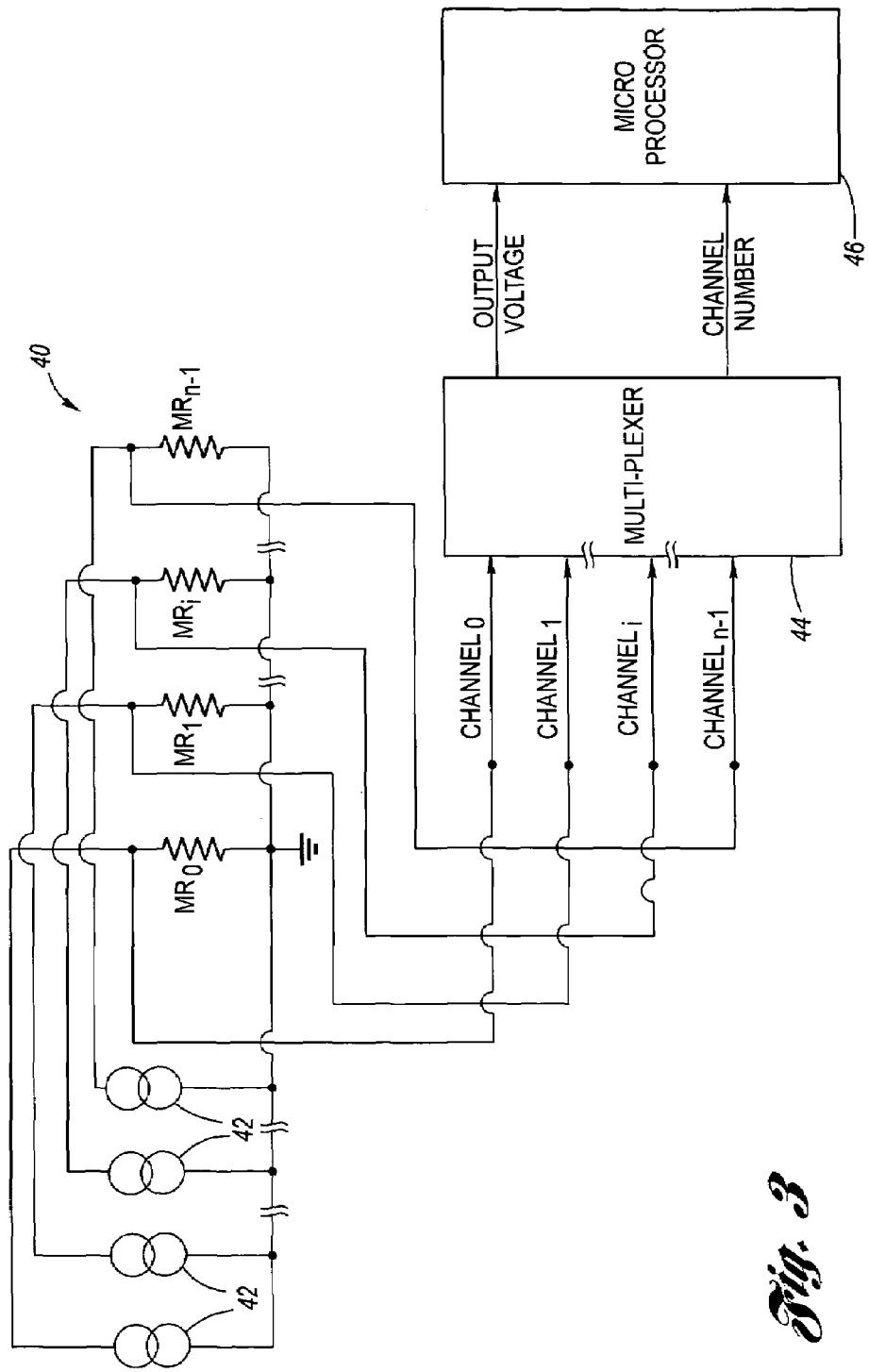
FIG. 3 is a circuit diagram including a circuit for exciting a magnetoresistor sensor array and a circuit for measuring the resultant magnetic flux density through the sensing elements.

FIG. 2 shows processing circuitry 50 that can be used when the linear array 12 comprises a plurality of sensing elements 14 in the form of Hall elements. There are n sensing elements, labeled Hall #0, Hall #1, . . . Hall #i, . . . Hall #n–1. Excitation of the sensing elements 14 can be performed by many different circuit designs. In FIG. 2, excitation is performed by a voltage supply 52, wherein each sensing element 14 is connected to the voltage supply.

The voltage output of each sensing element 14, Hall #0, Hall #1, . . . Hall #i . . . . Hall #n–1, representing the component of magnetic flux generated by the biasing magnet 18 at each sensing element is input to respective channels, Channel 0, Channel 1, . . . Channel i . . . . Channel n–1, of a multiplexer 54. The multiplexer 54 provides an output voltage associated with each channel number to a microprocessor 56. The microprocessor 56 can be, for example, part of a standard engine controller. In any case, memory may be required for storing the output data.

Of course, other processing circuitry known to those of skill in the art can be used to excite a magnetic element and measure magnetic flux density. For example, FIG. 3 shows processing circuitry 40 that can be used when the linear array 12 comprises a plurality of sensing elements 14 in the form of magnetoresistive (MR) elements. As in FIG. 2, there are n sensing elements 14, labeled $MR_0$, $MR_1$, . . . $MR_i$, . . . $MR_{n-1}$. Excitation of the sensing elements 14 can be performed by any number of circuit designs. In FIG. 3, excitation is performed by one or more, preferably, matched current sources 42. Each sensing element 14 is connected to a distinct current source 42 as depicted.

The voltage output of each sensing element 14, $MR_0$, $MR_1$, . . . $MR_i$, . . . $MR_{n-1}$, representing the component of magnetic flux generated by the biasing magnet 18 at each sensing element is input to respective channels, Channel 0, Channel 1, . . . Channel i, . . . Channel n–1, of a multiplexer 44. The multiplexer 44 provides an output voltage associated with each channel number to a microprocessor 46. The microprocessor 46 can be, for example, part of a standard engine controller. In any case, memory may be required for storing the output data.

With symmetric magnetic teeth 28, for example, the highest point of a peak in the magnetic flux density is at the center of the tooth. Conversely, with symmetric magnetic slots 30, for example, the lowest point of a valley of the magnetic flux density is at the center of the slot. The highest point of a peak or lowest point of a valley can be determined analytically by fitting a function having a peak or valley, e.g., cosine or a second-order or higher, even-order polynomial, to several of the voltage outputs obtained from sensing elements 14 closest to the highest point of a peak or the lowest point of a valley and then computing the location of the maximum (or minimum) of the function wherein the maximum of the function represents the highest point of the peak of the magnetic flux density and the minimum of the function represents the lowest point of the valley of the magnetic flux density.

However, the fitting of some functions requires far more computation than that of others without improved accuracy. Testing shows that very accurate results can be obtained by fitting a parabola to just three points, herein referred to as the three point parabolic fit method. The three point parabolic fit method comprises three sequential values of voltage outputs of sensing elements 14 representing the component of magnetic flux density at each sensing element that include the highest voltage output of a sensing element when the magnetic flux density includes a peak or the lowest voltage output of a sensing element when the magnetic flux density includes a valley. In this case, the position of the highest point of a peak or lowest point of a valley can be computed directly, without using a regression method.

Figure 4:
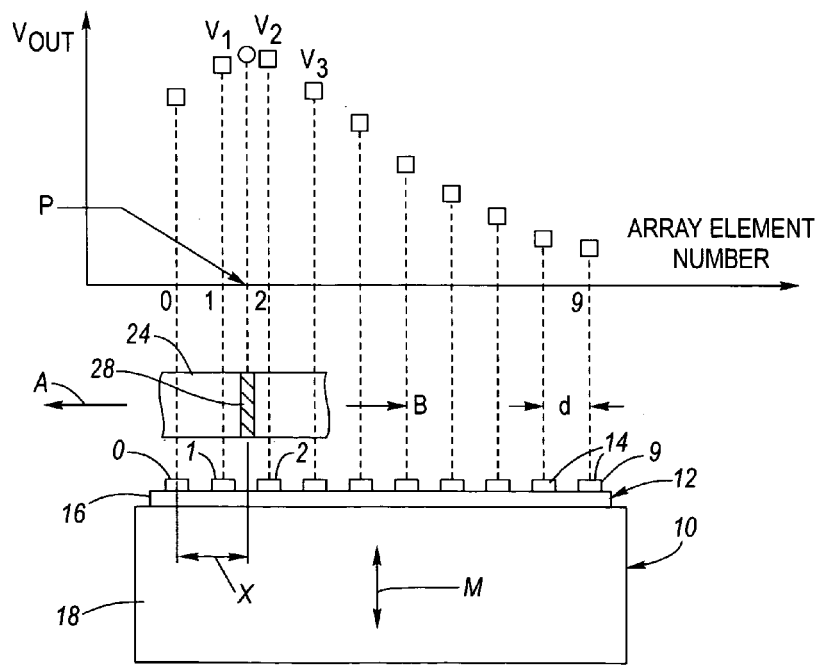
FIG. 4 is a schematic representation of a three point parabolic fit method.

As an example, FIG. 4 is a schematic representation of a three point parabolic fit method to determine the highest point of a peak of the magnetic flux density representing the center of a tooth 28, for example. The interpolated position P corresponding to the center of a tooth 28, for example, representing the location of the highest point of a peak relative to the sensing element 0 (i.e. the array origin 20) is given by:

$$P = 0.5[j_1^2(V_3-V_2)+j_2^2(V_1-V_3)+j_3^2(V_2-V_1)]/[j_1(V_3-V_2)+j_2(V_1-V_3)+j_3(V_2-V_1)] \quad (1)$$

where $j_1$ is a first array element number in a sequence of three sensing elements 14; $j_2$ is a second array element number in a sequence of three sensing elements including array element number $j_1$; $j_3$ is a third array element number in the sequence of three sensing elements including array elements numbered $j_1$ and $j_2$; $V_1$ is a first voltage output associated with array element number $j_1$; $V_2$ is the highest second voltage output associated with array element number $j_2$ when the magnetic flux density includes a peak or the lowest second voltage output $V_2$ associated with array element number $j_2$ when the magnetic flux density includes a valley; and $V_3$ is a third voltage output associated with array element number $j_3$.

Several examples of the parabolic fit method can be provided using a linear array 12 with n sensing elements 14 where the first array element number is i=0 and the last array element number is i=n−1. If the first array element number 0 has the highest (or lowest) voltage output $V_0$, array element numbers 0, 1 and 2 and their associated voltage outputs, for example, $V_0$, $V_1$, $V_2$, can be used to determine the highest (lowest) point of a peak (valley). Similarly, if the last array element number n−1 has the highest (or lowest) voltage output $V_{n-1}$, then array element numbers n−1, n−2 and n−3 and their associated voltage outputs, for example, $V_{n-1}$, $V_{n-2}$, $V_{n-3}$, can be used to determine the highest (lowest) point of a peak (valley).

In the example of FIG. 4, the highest measured voltage $V_2$ is associated with array element number i=2, that is, array element number 2. $V_1$ is associated with array element number i−1, i.e., array element number 1, and $V_3$ is associated with array element number i+1, i.e., array element number 3. The position P of the highest point of the peak relative to the position of array element 0 can be determined from equation (1). The distance X of the highest point of the peak from array element 0 is determined by X=P·d, where d is the distance between adjacent sensing elements 14 of the linear array 12. For example, if the distance d is a constant 160 micrometers between sensing elements 14 and the value of P from equation (1) is 1.67, X would be 267.2 micrometers. Notice, however, that there is more than one sequence of three array element numbers that include array element number 2 (i=2). Another sequence of three array element numbers that includes array element number i=2 also includes array element numbers i−1 and i−2, array element numbers 1 and 0, respectively. Yet another sequence of three array element numbers that includes array element number i=2 also includes array element numbers i+1 and i+2, array element numbers 3 and 4. It has been shown that even more accurate results can be obtained using the three point parabola fit method by calculating two positions $P_1$ and $P_2$ using two separate sequences, then averaging the two positions $P_1$ and $P_2$ to determine P. Although up to three sequences are available where the highest or lowest voltage output is somewhere other than the first sensing element 0 or last sensing element n−1, any additional accuracy due to the inclusion of the third sequence in the calculation of position does not appear to justify the additional computation required.

Figure 5:
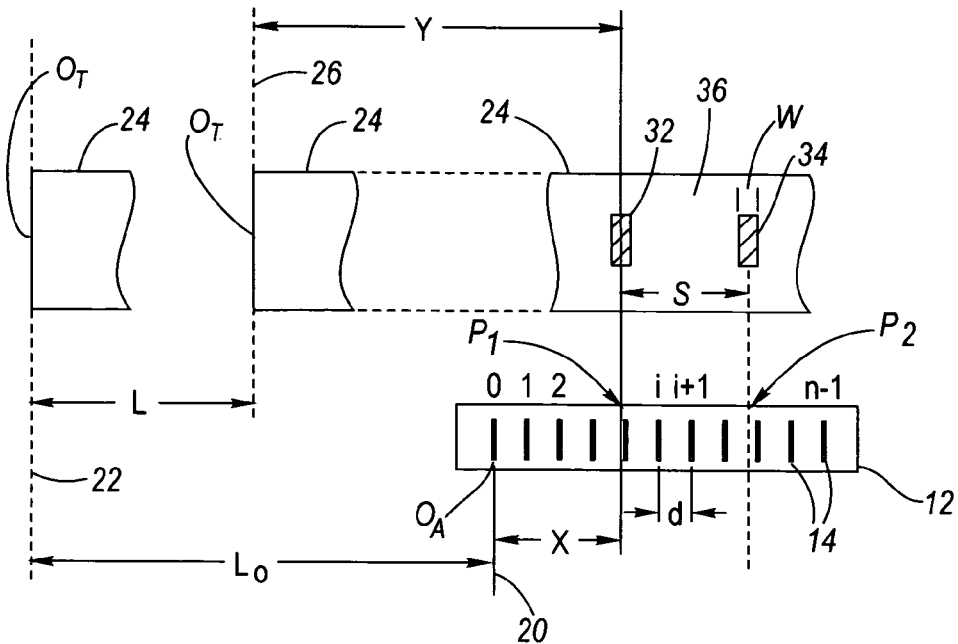
FIG. 5 depicts an example of determining the linear position or angular position of a target according to a first preferred embodiment of the present invention.

FIG. 5 depicts an example of determining the linear or angular present position 26 of a target origin $O_T$ of a target 24 from an initial position 22 of the target origin $O_T$ according to the first preferred embodiment of the present invention.

The linear array 12, in this example, consists of roughly identical equidistantly spaced d galvanomagnetic sensing elements 14 wherein the spacing d between adjacent galvanomagnetic sensing elements is known. The target 24 consists of magnetic irregularities in the form of teeth 32, 34, for example, preferably, each tooth having a width W that is narrower than the minimum spacing d between adjacent galvanomagnetic sensing elements 14 and slots 36, wherein the spacing S of slots between adjacent teeth varies in a predetermined manner. The spacing S of the slots 36 is available, for example, from a lookup table stored in microprocessor 46, 56 memory, so that the location of a tooth 32, for example, from the target origin $O_T$ can be uniquely identified. Two adjacent teeth, for example teeth 32, 34, at a position above the linear array 12 result in two peaks in the magnetic flux density sensed by the sensing elements 14. The positions $P_1$ and $P_2$ which correspond to the centers of teeth 32, 34, respectively, can be determined by techniques previously mentioned, as for example through the use of the parabolic fit method previously described. The spacing S between the teeth 32, 34 can be determined by S=d·($P_2$−$P_1$), whereby the distance Y of tooth 32 from the target origin $O_T$ is uniquely identified through the use of the lookup table stored in microprocessor 46, 56 memory. The distance X of the tooth 32 from the array origin $O_A$ is determined by the product of d times $P_1$, that is, X=d·($P_1$), wherein the distance $L_0$ of the array origin $O_A$ from the initial position 22 of the target origin $O_T$ is known. Thus, the linear or angular present position 26 of the target origin $O_T$ from the initial position 22 of the target origin $O_T$ is a distance L, given by the relation:

$$L=L_0X-Y \qquad (2).$$

Figure 6:
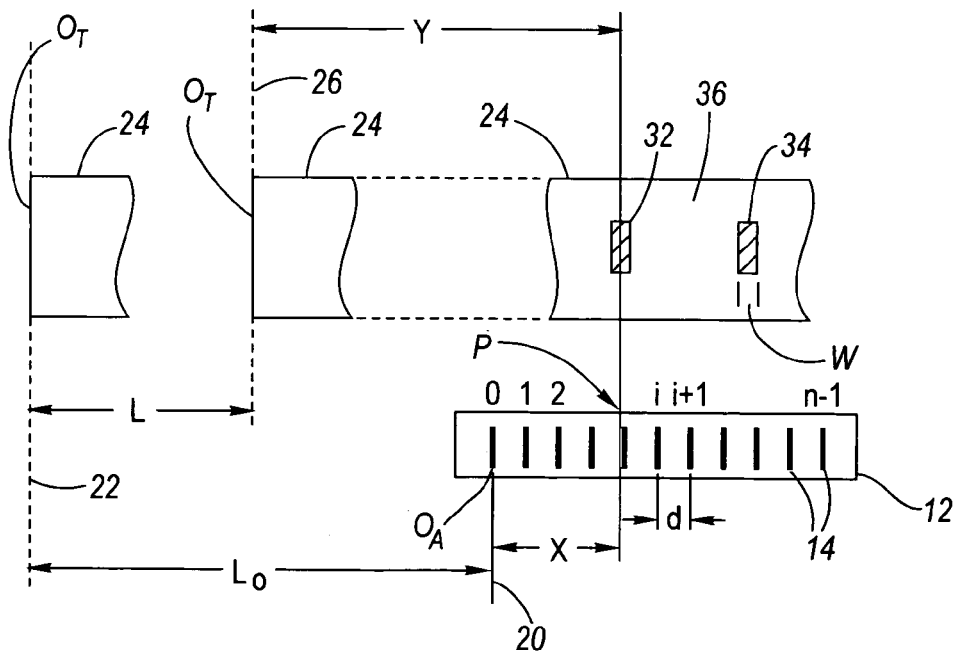
FIG. 6 depicts an example of determining the linear position or angular position of a target according to a second preferred embodiment of the present invention.

FIG. 6 depicts an example of determining the linear position or angular present position 26 of a target origin $O_T$ of a target 24 from an initial position 22 of the target origin $O_T$ according to the second preferred embodiment of the present invention.

The linear array 12, in this example, consists of roughly identical equidistantly spaced d galvanomagnetic sensing elements 14 wherein the spacing d between adjacent galvanomagnetic sensing elements is known and is, preferably, larger than the width W of a tooth 32 or 34, for example. The target 24 consists of teeth 32, 34, for example, preferably, narrower than the minimum spacing d between adjacent galvanomagnetic sensing elements 14 and slots 36 wherein, in this example, each tooth 32 having unique predetermined features, for example, is uniquely identifiable from a single peak of the magnetic flux density which thereby uniquely determines the position of each tooth with respect to the target origin $O_T$. The identification of the tooth 32 and its distance Y from the target origin $O_T$ is available, for example, from a lookup table stored in microprocessor 46, 56 memory. Position P corresponding to the center of tooth 32, for example, can be determined by techniques previously mentioned, for example, through the use of the parabolic fit method previously described. The distance Y of the tooth 32 from the target origin $O_T$ is uniquely identified through the use of the lookup table stored in microprocessor 46, 56 memory. The location X of the tooth 32 from the array origin $O_A$ is determined by the product of d times P, that is, X=d·(P), whereas the distance $L_0$ of the array origin $O_A$ from the initial position 22 of the target origin $O_T$ is known. Thus, the linear or angular present position 26 of the target 24 from the initial position 22 of the target is a distance L, given by the relation:

$$L=L_0+X-Y \qquad (3).$$

The sizes mentioned herein for the target, magnet, spacing d and length D are by example only. A linear array 12 with a long length D is more expensive. The smaller the spacing d, the more accurate the sensor 10 for the same length D of the linear array since it has more sensing elements 14. However, the smaller the spacing d, the smaller the air gap 19 should be. Thus, assembly tolerances become an issue. The balance between tight tolerance requirements, accuracy and size, which equates directly to price, is application-specific and can be determined by one of skill in the art based upon the teachings herein.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A method for determining movement of a movable target with respect to a fixed initial location, comprising the steps of:
   designating the fixed initial location;
   providing the moveable target movable with respect to the initial location, wherein the movable target has a plurality of individually identifiable magnetic irregularities, and wherein the moveable target has a target origin;
   providing a stationary magnetosensitive array proximally located with respect to the moveable target such that the array senses the magnetic irregularities of the moveable target, the array having an array origin located at a predetermined fixed distance, $L_0$, from the fixed initial location;
   identifying a magnetic irregularity of the moveable target;
   determining a first distance, Y, equal to a distance of the identified magnetic irregularity to the target origin;
   determining a position of the identified magnetic irregularity with respect to the array, wherein a second distance, X, is determined which is equal to a distance of the identified magnetic irregularity to the array origin; and
   determining a target origin distance, L, of the target origin with respect to the fixed initial location, according to a relation: $L=L_0+X-Y$.

2. The method of claim 1, wherein said step of identifying comprises:
   the array sensing a magnetic effect of at least one magnetic irregularity; and
   identifying a magnetic irregularity from the at least one magnetic irregularity.

3. The method of claim 2, wherein:
   said step of identifying further comprises matching the sensed magnetic effect to data of a look up table to thereby identify the magnetic irregularity; and
   said step of determining the first distance Y comprises matching the identified magnetic irregularity to data of a look up table to thereby provide Y.

4. The method of claim 3, wherein said step of determining the second distance, X, comprises:
   algorithmically determining a location within the array of the identified magnetic irregularity, wherein X equals the distance between the array origin and the determined identified magnetic irregularity location within the array.

5. The method of claim 1, wherein said step of identifying comprises:
   the array sensing magnetic effects of magnetic irregularities; and
   identifying a magnetic irregularity by mathematical interpolation.

6. The method of claim 5, wherein said mathematical interpolation comprises mathematically fitting a parabola to the sensed magnetic effects of at least three magnetic irregularities, wherein an interpolated peak of the parabola corresponds to the identified magnetic irregularity.

7. The method of claim 5, wherein said step of determining the first distance Y comprises matching the identified magnetic irregularity to data of a look up table to thereby provide Y.

8. The method of claim 7, wherein said mathematical interpolation comprises mathematically fitting a parabola to the sensed magnetic effects of at least three magnetic irregularities, wherein an interpolated peak of the parabola corresponds to the identified magnetic irregularity.

9. The method of claim 7, wherein said step of determining the second distance, X, comprises:
   algorithmically determining a location within the array of the identified magnetic irregularity, wherein X equals the distance between the array origin and the determined identified magnetic irregularity location within the array.

10. The method of claim 9, wherein said mathematical interpolation comprises mathematically fitting a parabola to the sensed magnetic effects of at least three magnetic irregularities, wherein an interpolated peak of the parabola corresponds to the identified magnetic irregularity.

11. A position sensor, comprising:
    a movable target having a plurality of magnetic irregularities, wherein each magnetic irregularity is individually identifiable, said movable target having a target origin;
    a fixed array comprising a plurality of magnetosensitive elements positioned relative to said magnetic irregularities to enable sensing magnetic effects of said magnetic irregularities, said array having an array origin; and
    electrical circuit means for determining a present position of said target origin relative to a fixed initial position of said target origin according to a relation $L=L_0+X-Y$, wherein L is a distance of the present position of the target origin to the fixed initial position, $L_0$ is a distance of the array origin to the fixed initial position, X is a distance of the array origin to a location in the array of an identified magnetic irregularity sensed by the array, and Y is a distance of the identified magnetic irregularity to the target origin.

12. The position sensor of claim 11, wherein said plurality of magnetic irregularities comprises a sequential series of teeth and slots having predetermined shapes which provide said plurality of magnetic irregularities to be individually identifiable.

13. The position sensor of claim 12, wherein said predetermined shapes comprises said teeth being substantially of a constant width and said slots being of mutually different widths.

14. The position sensor of claim 13, wherein said array has a substantially constant distance of separation between adjacent magnetosensitive elements thereof; and wherein said width of said teeth is less than said distance of separation between adjacent magnetosensitive elements.

* * * * *